United States Patent
Mizuno et al.

(10) Patent No.: US 8,263,011 B2
(45) Date of Patent: Sep. 11, 2012

(54) REACTOR

(75) Inventors: Hiroshi Mizuno, Kagamihara (JP); Michio Takahashi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 374 days.

(21) Appl. No.: 12/716,491

(22) Filed: Mar. 3, 2010

(65) Prior Publication Data

US 2010/0239472 A1 Sep. 23, 2010

(30) Foreign Application Priority Data

Mar. 18, 2009 (JP) .................. 2009-066012

(51) Int. Cl.
*B01J 19/08* (2006.01)
(52) U.S. Cl. .................. 422/186.04
(58) Field of Classification Search .............. 422/186.04
See application file for complete search history.

(56) References Cited

U.S. PATENT DOCUMENTS 7,354,558 B2 * 4/2008 Tsuji ............ 422/177

FOREIGN PATENT DOCUMENTS

| JP | 2003-073103 A1 | 3/2003 |
|---|---|---|
| JP | 2003-514166 A1 | 4/2003 |
| JP | 2004-345879 A1 | 12/2004 |
| JP | 2006-056748 A1 | 3/2006 |
| JP | 2006-248847 A1 | 9/2006 |
| WO | 01/14702 A1 | 3/2001 |
| WO | 01/33056 A1 | 5/2001 |

OTHER PUBLICATIONS

U.S. Appl. No. 12/618,885, filed Nov. 16, 2009, Mizuno et al.
U.S. Appl. No. 12/716,510, filed Mar. 3, 2010, Mizuno et al.

* cited by examiner

*Primary Examiner* — Kishor Mayekar
(74) *Attorney, Agent, or Firm* — Burr & Brown

(57) ABSTRACT

Reactor 1A includes a reaction vessel 10 having an inlet 4 for a to-be-reformed gas 2 and an outlet 8 for a reformed gas 6, a pair of electrodes 12 for plasma generation, a power source 14 for applying a voltage to the pair of electrodes 12, and a catalyst for promoting a reforming reaction, wherein one of the pair of electrodes 12 is a linear electrode 32, the other of the pair of electrodes 12 is a honeycomb electrode 34 made of a conductive ceramics, and the catalyst is loaded on the partition walls of the honeycomb electrode 34, which reactor further includes shielding members 30A placed between the linear electrode 32 and the honeycomb electrode 34, which are protruded toward the gas-introducing end face side of the honeycomb electrode 34 and prevent the inflow of the to-be-reformed gas 2 passing through a zone other than a plasma-generating zone 42.

9 Claims, 9 Drawing Sheets

REACTOR

TECHNICAL FIELD

The present invention relates to a reactor in which reforming reaction is conducted by a plasma generated between a pair of electrodes and a catalyst for promoting the reforming reaction.

BACKGROUND ART

In recent years, hydrogen has been drawing attention as a clean energy. As a process for obtaining such hydrogen, there is known a reforming reaction for the hydrocarbon contained in gasoline, kerosene, gas oil or the like. However, a high temperature of 700 to 900° C. is generally required in the reforming reaction of the hydrocarbon contained in gasoline or the like; therefore, a large reforming apparatus is needed and, moreover, a large starting energy and a long starting time are required in order to advance the reforming reaction. Hence, there is being investigated a technique of applying a pulse voltage or the like to a pair of electrodes to generate a plasma and utilizing the plasma to conduct a reforming reaction at a low temperature at a high efficiency.

There is, for example, a proposal on a plasma fuel converter in which glow discharge is generated between a pair of electrodes and the plasma generated by the glow discharge is utilized to convert a fuel (see Patent Document 1).

There is also a proposal on a method and apparatus in which pulse discharge is conducted in a mixed gas (a to-be-reformed gas) of alcohol and steam to generate a plasma and a reforming reaction of the mixed gas is conducted using the plasma, to generate hydrogen (see Patent Document 2).

There is further a proposal on a reformer in which a pair of electrodes are placed inside the cells of a honeycomb structure made of an insulating material (e.g. cordierite), discharge is conducted inside the cells to generate a plasma, and a reforming reaction is conducted using the plasma (see Patent Document 3).

The plasma fuel converter, etc. described in the Patent Documents 1 to 3, as compared with the conventional art, have an advantage that the reforming of hydrocarbon can be carried out at a relatively low cost under the mild conditions of low temperature and normal pressure. However, they have not been fully satisfactory in the reaction efficiency of reforming reaction.

Hence, it is being attempted to promote the reforming reaction and enhance the reaction efficiency of reforming reaction by, in conducting a reforming reaction using a plasma, using further a catalyst for promotion of reforming reaction. In this case, the reforming reaction is considered to proceed synergistically by the action of plasma and the action of catalyst.

There is, for example, a proposal on a hydrocarbon reforming apparatus which have a gas-mixing vessel for mixing a hydrocarbon and steam, a power source and a pair of electrodes present inside the gas-mixing vessel and wherein a voltage of particular pulse frequency is applied to the pair of electrodes to generate a plasma and a conversion reaction into hydrogen is conducted using the plasma (see Patent Document 4). The Patent Document 4 describes that the conversion reaction can be promoted by filling a particulate catalyst inside the gas-mixing vessel (a so-called packed bed method).

There is also a proposal on a fuel reforming apparatus which has a reactor, a pair of needle-like electrodes disposed inside the reactor so as to face each other, a device for voltage application, a particulate oxide catalyst, and a catalyst-holding means for holding the oxide catalyst in the reactor (see Patent Document 5).

Patent Document 1: National Publication of International Patent Application No. 2003-514166
Patent Document 2: JP-A-2003-73103
Patent Document 3: JP-A-2006-248847
Patent Document 4: JP-A-2004-345879
Patent Document 5: JP-A-2006-56748

SUMMARY OF THE INVENTION

The hydrocarbon reforming apparatus, etc. described in the Patent Document 4 or 5 utilize the plasma generated by discharge and further use a catalyst; therefore, the promotion of reforming reaction and the resultant enhanced reaction efficiency of reforming reaction can be expected.

However, since the hydrocarbon reforming apparatus, etc. described in the Patent Document 4 or 5 use a granular catalyst, the contact between catalyst particles becomes a point contact, making inferior the heat transfer between catalyst particles. Accordingly, there has been a problem of low startability of reforming reaction. Further, when the packed bed method is employed, a to-be-reformed gas passes through the gaps between the catalyst particles filled in the reactor and is used only at a space velocity of several thousands $h^{-1}$ or lower. Accordingly, it is unable to increase the treatment rate of the to-be-reformed gas, making it impossible to produce a large amount of a reformed gas (hydrogen).

The present invention has been made in view of the above-mentioned problems and has a task to provide a reactor which is superior in the reaction efficiency of reforming reaction, can produce a large amount of a reformed gas, is low in power consumption, and is small in the load to electrode and long in the use time of electrode.

The present inventors made a study in order to solve the above-mentioned problems of the prior art. As a result, it was found that the problems could be solved by constituting a reactor in such a way that a honeycomb-shaped electrode (a honeycomb electrode) made of a conductive ceramics is used as one of a pair of electrodes for plasma generation, shielding membranes are disposed between the pair of electrodes to prevent the inflow of a gas not passing through a plasma-generating zone, and the to-be-reformed gas activated by the generated plasma (or, partially given rise to a reforming reaction) can be preferentially introduced into the cells of the honeycomb electrode. The finding has led to the completion of the present invention. Specifically, a reactor described below is provided by the present invention.

[1] A reactor comprising
a reaction vessel having an inlet for a to-be-reformed gas and an outlet for a reformed gas,
a pair of electrodes for plasma generation, disposed in an internal space of the reaction vessel so as to face each other,
a power source for applying a voltage to the pair of electrodes, and
a catalyst for promoting reforming reaction of the to-be-reformed gas,
wherein
one of the pair of electrodes is a linear electrode,
the other of the pair of electrodes is a honeycomb electrode made of a conductive ceramics having a plurality of cells to act as gas passages partitioned by partition walls, and
the catalyst is loaded on the partition walls of the honeycomb electrode, the reactor further comprising
shielding members protruded from a gas-introducing end face of the honeycomb electrode in a space between the linear electrode and the honeycomb electrode to prevent the to-be-reformed gas passing through a zone other than a plasma-generating zone from flowing into the honeycomb electrode.
[2] A reactor according to [1] further comprising
a pair of honeycomb electrode supports for supporting and holding the honeycomb electrode, being made of an insulating material and disposed so as to sandwich the honeycomb electrode and face each other,
wherein each of the shielding members is constituted by a protrusion formed by a part of each of the honeycomb electrode supports protruded from the gas-introducing end face of the honeycomb electrode.
[3] A reactor according to the above [2], wherein each protrusion is constituted so as to abut part of the gas-introducing end face of the honeycomb electrode and has slits formed therein, each slit forcing the internal space of each cell overlapping with the protrusion, to communicate with the internal space of the reaction vessel.
[4] A reactor according to the above [3], wherein slits are formed to reach openings of outermost cells of the honeycomb electrode so that the internal space of the reaction vessel communicates with an internal space of each of the outermost cells of the honeycomb electrode.
[5] A reactor according to the above [2], wherein the protrusion is formed in such a wedge shape that a protrusion volume becomes less from the inlet side of the reaction vessel toward an end face side of the honeycomb electrode.
[6] A reactor according to the above [5], wherein the protrusion has an inclined plane extending from an end face of the protrusion facing the inlet side of the reaction vessel, to outside of the openings of the outermost cells of the honeycomb electrode, so that the internal space of each of the outermost cells of the honeycomb electrode communicates with the internal space of the reaction vessel.
[7] A reactor according to any one of the above [1] to [6], wherein the honeycomb electrode is made of the conductive ceramics including silicon carbide.
[8] A reactor according to any one of the above [1] to [7], wherein the honeycomb electrode has a thermal conductivity of 10 to 300 W/mk.
[9] A reactor according to any one of the above [1] to [8], wherein the power source is a high-voltage pulse power source using a static induction type thyristor.

The reactor of the present invention is superior in the reaction efficiency of reforming reaction, can produce a large amount of a reformed gas, is low in power consumption, and is small in the load to electrode and long in the use time of electrode.

Figure 1A:
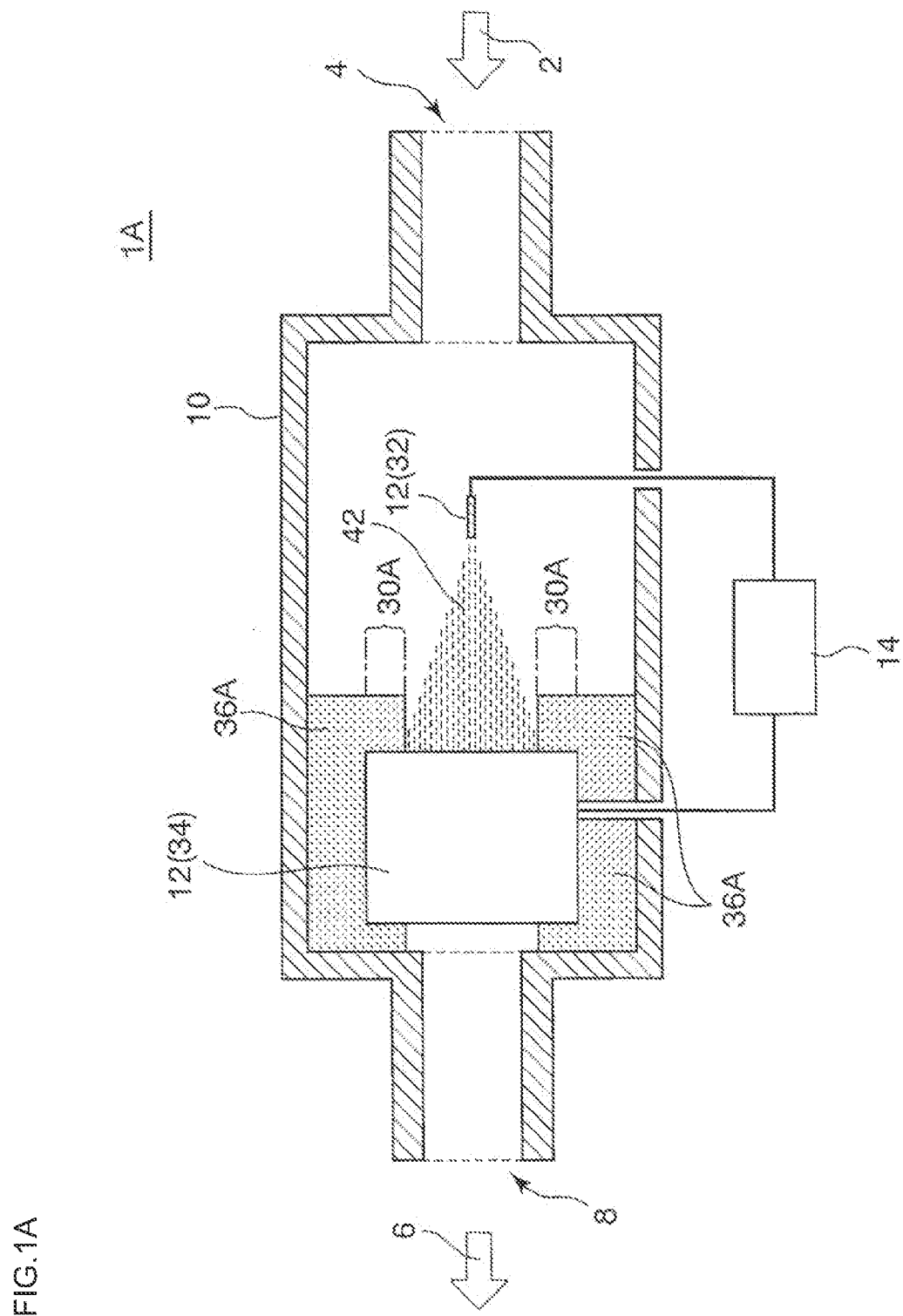
FIG. 1A is a schematic view showing one embodiment of the reactor of the present invention.

DESCRIPTION OF REFERENCE NUMERALS 1A, 1B, 1C, 1D, 100: a reactor, 2: to-be-reformed gas, 4: inlet, 6: reformed gas, 8: outlet, 10: reaction vessel, 12: electrode, 14: power source, 16: cell, 30A, 30B, 30C, 30D: shielding member, 32: linear electrode, 34: honeycomb electrode, 36, 36A, 36B, 36C, 36D: honeycomb electrode support, 40A, 40B: inclined plane, 42: plasma-generating zone.

DESCRIPTION OF THE PREFERRED EMBODIMENTS

Embodiments of the reactor of the present invention are described below. However, the present invention includes various reactors satisfying the matters specified by the present invention and is in no way restricted to the following embodiments.

[1] Characteristics of the Reactor of the Present Invention

The reactor of the present invention is characterized in that, as shown in the plasma-catalyst reaction apparatus 1A shown in FIG. 1A, one of a pair of electrodes 12 is a linear electrode 32, the other of the pair of electrodes 12 is a honeycomb electrode 34 which is made of a conductive ceramics and wherein a plurality of cells to act as gas passages are formed by being surrounded by partition walls, a catalyst is loaded on the partition walls of the honeycomb electrode 34, and, between the linear electrode 32 and the honeycomb electrode 34, there are disposed shielding members 30A which prevent the inflow of a to-be-reformed gas 2 having passed through a zone other than a plasma-generating zone 42.

By thus using a honeycomb electrode 34 as the other of the pair of electrodes 12, as compared with a case of using needle-shaped electrodes or flat plate-shaped electrodes, the thermal deterioration of electrode in discharge is small and the electrodes 12 can have higher durability. Therefore, the present reactor can also be used preferably in applications such as fuel reformer for vehicle mounting wherein stable supply of a reformed gas is required over a long period of time.

Also, when a honeycomb electrode 34 is used as the other of the pair of electrodes 12, a voltage can be applied to the whole portion of the honeycomb electrode 34; accordingly, the electrode area becomes wider and the area of discharge occurrence becomes wider. As a result, as compared with a case of using a pair of needle-shaped electrodes, the plasma-generating zone can be made wider; moreover, the startability and reaction efficiency of reforming reaction can be enhanced owing to the action of the catalyst loaded on the honeycomb electrode 34; resultantly, the reaction efficiency of reforming reaction can be enhanced even when the inner diameter of reaction vessel 10 has been enlarged.

Further, since the honeycomb electrode 34 has a honeycomb structure having partition walls, a catalyst is easily loaded thereon. Therefore, by loading a catalyst which promotes a reforming reaction, the reforming reaction of the to-be-reformed gas 2 can be advanced easily. Thereby, the action of plasma and the action of catalyst can be made synergistic and the reforming reaction can be advanced at a high efficiency.

When a catalyst is loaded on the partition walls of the honeycomb electrode 34, as compared with when a particulate catalyst is filled in the packed bed method, cells to act as gas passages are secured and thereby the to-be-reformed gas 2 passes easily in the reaction vessel 10. As a result, the to-be-reformed gas 2 can be treated at a space velocity of several tens of thousands to several hundreds of thousands $h^{-1}$ (that is, at a high treatment rate).

Furthermore, when a catalyst is loaded on the partition walls of the honeycomb electrode 34, as compared with when a particulate catalyst is filled in the packed bed method, the heat transfer in catalyst is rapid, enhancing the startability of reforming reaction. As a result, the treatment rate and treatment amount of a to-be-reformed gas 2 can be enhanced strikingly and a large amount of a reformed gas 6 can be produced. Thereby, the present reactor can also be used, for example, in early activation of catalyst during the engine start of internal combustion engine (cold start application).

Also, when the above-mentioned shielding members 30A are disposed, the ratio at which the to-be-reformed gas 2 activated (or partially given rise to a reaction) by passing through the plasma-generating zone 42 passes through the cells of the honeycomb electrode 34, increases strikingly while the to-be-reformed gas 2 having passed through a zone other than the plasma-generating zone 42 hardly enters the cells of the honeycomb electrode 34. Therefore, the reaction efficiency of reforming reaction increases and a large amount of a reformed gas 6 can be produced.

Figure 5:
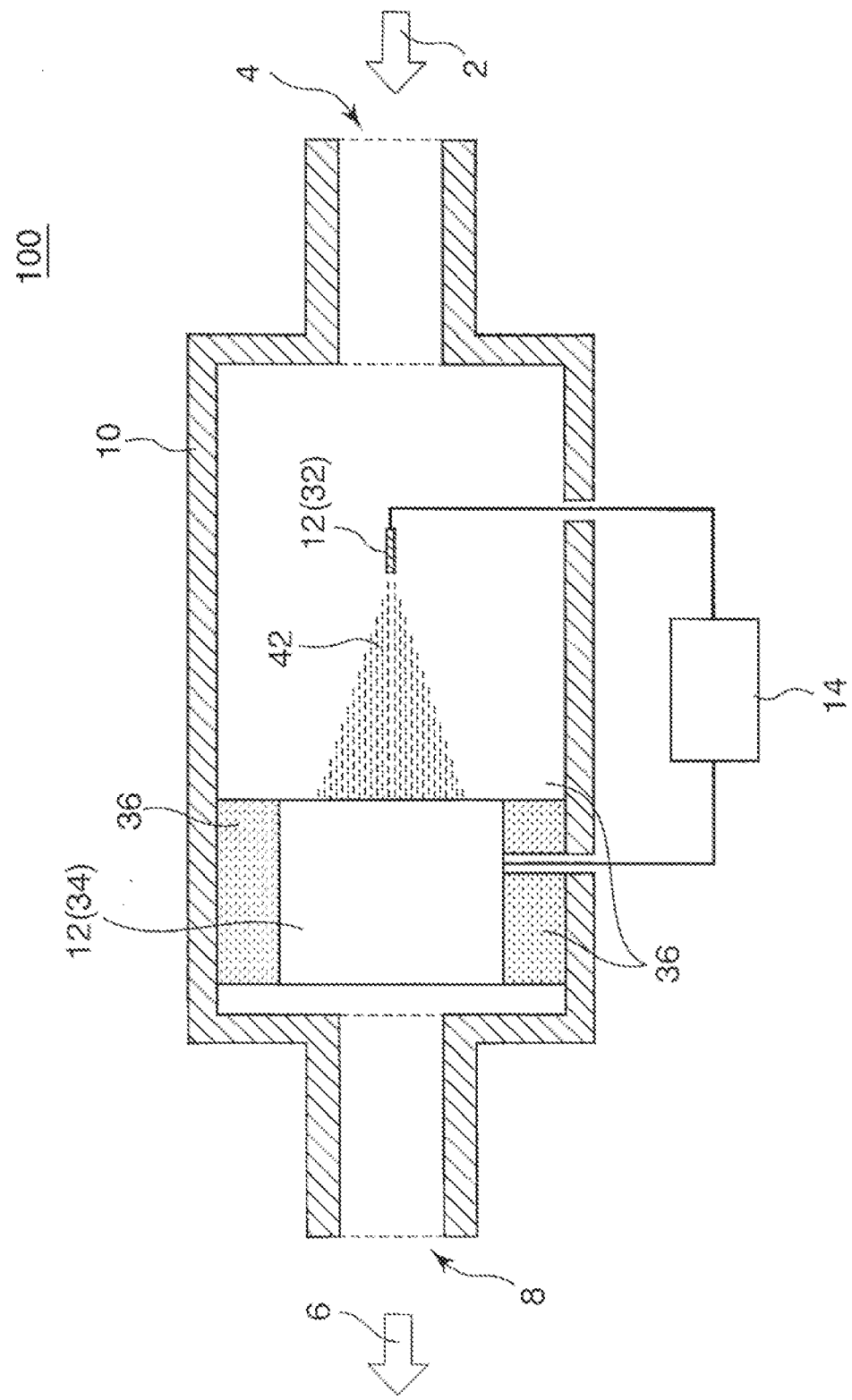
FIG. 5 is a schematic view showing an embodiment of the reactor of Comparative Example 1.

Meanwhile, when there is used no shielding member as in the reactor 100 shown in FIG. 5, a to-be-reformed gas 2 inactive (or given rise to no reaction) owing to not passing through the plasma-reforming zone 42, easily enters the cells of the honeycomb electrode 34, which may reduce the reaction efficiency of reforming reaction.

Further, when the shielding members 30A are disposed, the reaction efficiency of reforming reaction can be maintained even if the plasma-generating zone 42 is made small; therefore, the voltage applied between the linear electrode 32 and the honeycomb electrode 34 can be made small. Accordingly, the power consumed by the reforming reaction can be reduced, the load applied to honeycomb electrode 34 and linear electrode 32 can be lessened, and accordingly the use time (durability) of honeycomb electrode 34 and linear electrode 32 can be made longer.

[2] Reactor

As the constituent members of the present reactor, there can be mentioned, as seen in the reactor 1A of FIG. 1A, shielding members 30A, a honeycomb electrode 34, a linear electrode 32, a catalyst, a reaction vessel 10, a power source 10, etc.

[2-1] Shielding Members

The reactor of the present invention, as shown in the plasma-catalyst reaction apparatus 1A of FIG. 1A, has shielding members 30A for protecting the inflow of a to-be-reformed gas 2 having passed through a zone other than a plasma-generating zone 42. That is, the shielding members 30A are members for forcing a to-be-reformed gas [which has passed through the plasma-generating zone 42 and has been activated (or has partially given rise to a reaction)] to preferentially enter the cells of honeycomb electrode 34.

As shown in FIG. 1A, the shielding members 30A are disposed between a linear electrode 32 for plasma generation and a honeycomb electrode 34 in order to prevent the inflow of a to-be-reformed gas 2 having passed through a zone other than a plasma-generating zone 42. The distance between the shielding members 30A is preferably 7 mm to 15 mm, more preferably 9 mm to 13 mm in order to prevent the inflow of the to-be-reformed gas 2 having passed through a zone other than a plasma-generating zone 42 and prevent an increase in pressure loss. When the distance is smaller than 7 mm, even the to-be-reformed gas having passed through the plasma-generating zone 42 is unlikely to enter the honeycomb electrode and the pressure loss may increase. Meanwhile, when the distance is larger than 15 mm, it is impossible to sufficiently prevent the inflow of the to-be-reformed gas 2 having passed through a zone other than a plasma-generating zone 42, and the reaction efficiency of reforming reaction may fall.

As to the shape of the shielding members, there is no particular restriction as long as they can prevent the inflow of the to-be-reformed gas having passed through a zone other than a plasma-generating zone and can prevent the entering of the gas into the cells of the honeycomb electrode. However, as shown in FIG. 1A, the linear electrode 32 forming a pair with the honeycomb electrode 34 is disposed so as to oppose the central part of the gas-introducing end face (cell-opening end face) of the honeycomb electrode 34 and a plasma is generated between the linear electrode 32 and the honeycomb electrode 34; therefore, it is preferred that a protrusion capable of preventing the inflow of to-be-reformed gas is formed at a part corresponding to the outer periphery of the gas-introducing end face of the honeycomb electrode 34 and, on the other hand, a to-be-reformed gas 2 can flow into a part corresponding to the central part of the gas-introducing end face of the honeycomb electrode 34.

Figure 1B:
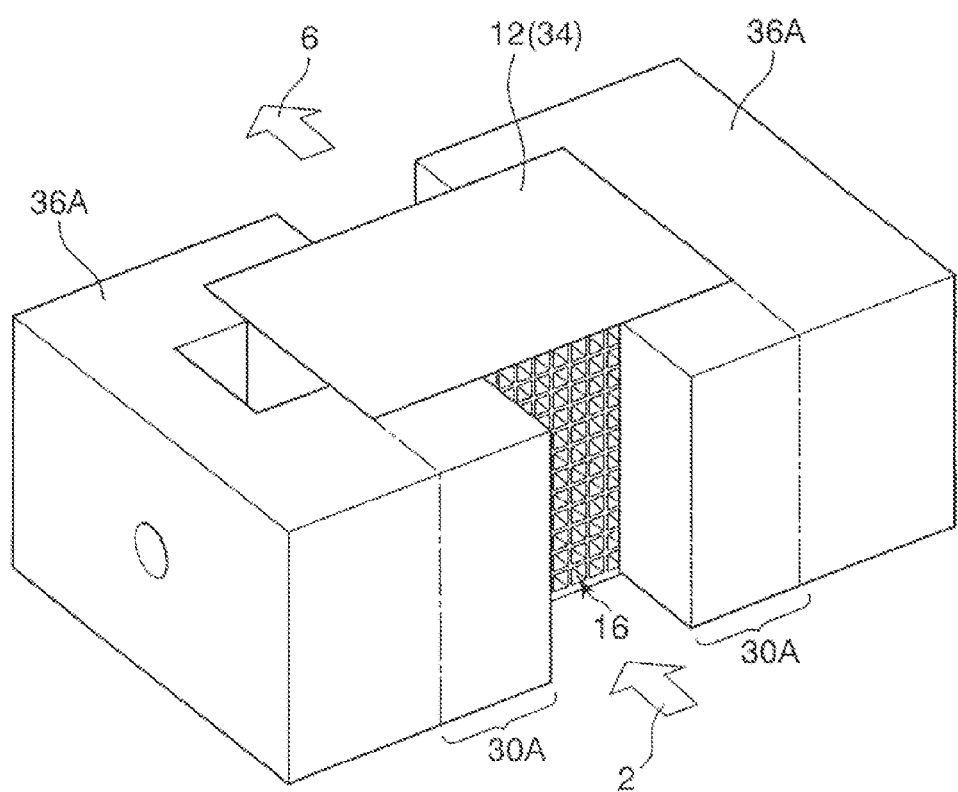
FIG. 1B is a perspective view showing a honeycomb electrode and shielding members constituting the reactor shown in FIG. 1A.

It is not necessary to dispose, as in the reactor 1A of FIG. 1A or the reactor 1B of FIG. 1B, the shielding members 30A or 30B so as to abut the end face of the honeycomb electrode 34, as long as the shielding members can prevent the inflow of the to-be-reformed gas having passed through a zone other than a plasma-generating zone. As in the reactor 1C of FIG. 3A or the reactor 1D of FIG. 4A, the shielding members 30C or 30D need not abut the end face of the honeycomb electrode 34 and may protrude toward the end face side of the honeycomb electrode 34.

The reactor 1A of FIG. 1A has a pair of left and right shielding members 30A, and they are constituted so as to protrude from the left and right peripheral areas of the gas-introducing end face of the honeycomb electrode 34 and prevent the inflow of the to-be-reformed gas from the above-mentioned peripheral areas. The pair of shielding members 30A are disposed so as to be apart having an in-between space corresponding to the width-direction central area of the gas-introducing end face of the honeycomb electrode 34 and a to-be-reformed gas 2 can pass through the space and flow into the cells 16 of the honeycomb electrode 34. The reactor 1A of FIG. 1A is a case in which the pair of shielding members 30A form a rectangular opening between them and a to-be-reformed gas 2 can flow into the cells 16 through this opening. However, the shape of the opening may be circular, quadrangular other than rectangular, etc.

In the present reactor, the shielding members may be particular members but may also be constituted by part of other constituent member of the reactor.

In a reactor such as used in the present invention, the honeycomb electrode is disposed, in many cases, inside the reaction vessel via a honeycomb electrode support made of an insulating material, for reasons such as the prevention of short-circuiting between the honeycomb electrode and the metal-made reaction vessel. Therefore, it is preferred that the reactor of the present invention, as in the reactor 1A of FIG. 1A, further has a pair of honeycomb electrode supports 36A for supporting and holding the honeycomb electrode 34, which are made of an insulating material and are disposed so as to sandwich the honeycomb electrode 34 and face each other and that each shielding member 30A is constituted by a protrusion formed by protruding part of each honeycomb electrode support 36A toward the gas-introducing end face side of the honeycomb electrode support 36A. Such a constitution is preferred in that there is no need of using a particular member exclusively used as a shielding member.

As the insulating material constituting the honeycomb electrode support, a ceramics can be used preferably. Preferably used are, for example, alumina, zirconia, silicon nitride, aluminum nitride, SIALON, mullite, silica, cordierite, etc. These ceramics can be used alone or in combination of two or more kinds.

As shown in FIG. 1A and FIG. 1B, the honeycomb electrode supports 36A are disposed, in many cases, so as to sandwich the honeycomb electrode 34 and face each other so that they can sandwich the honeycomb electrode 34 from two directions to hold and fix it. The reactor 1A of FIG. 1A is a case having a pair of left and right honeycomb electrode supports 36A to sandwich the honeycomb electrode 34 from left and right directions to hold and fix it.

In the reactor of the present invention, the reaction efficiency of reforming reaction is enhanced by using shielding members and forcing a to-be-reformed gas which has passed through the plasma-generating zone and been activated (or partially given rise to a reaction), to preferentially enter the cells of the honeycomb electrode. Therefore, the reaction efficiency can be enhanced even when, as shown in FIG. 1A and FIG. 1B, part of the gas-introducing end face of the honeycomb electrode 34 is completely plugged by the shielding members 30A.

However, it is preferred to increase the number of unplugged, open cells in order to 1) easily pass the to-be-reformed gas through the reaction vessel to increase the treatment rate and treatment volume of to-be-reformed gas and 2) increase the contact frequency between the to-be-reformed gas and the catalyst loaded on the partition walls of honeycomb electrode to enhance the reaction efficiency of reforming reaction.

In order to increase the number of open cells, it is necessary to employ a structure which can prevent the inflow of the to-be-reformed gas having passed through the plasma-generating zone, in such a state that the plugging of the cell openings of honeycomb electrode has been minimized.

Figure 2A:
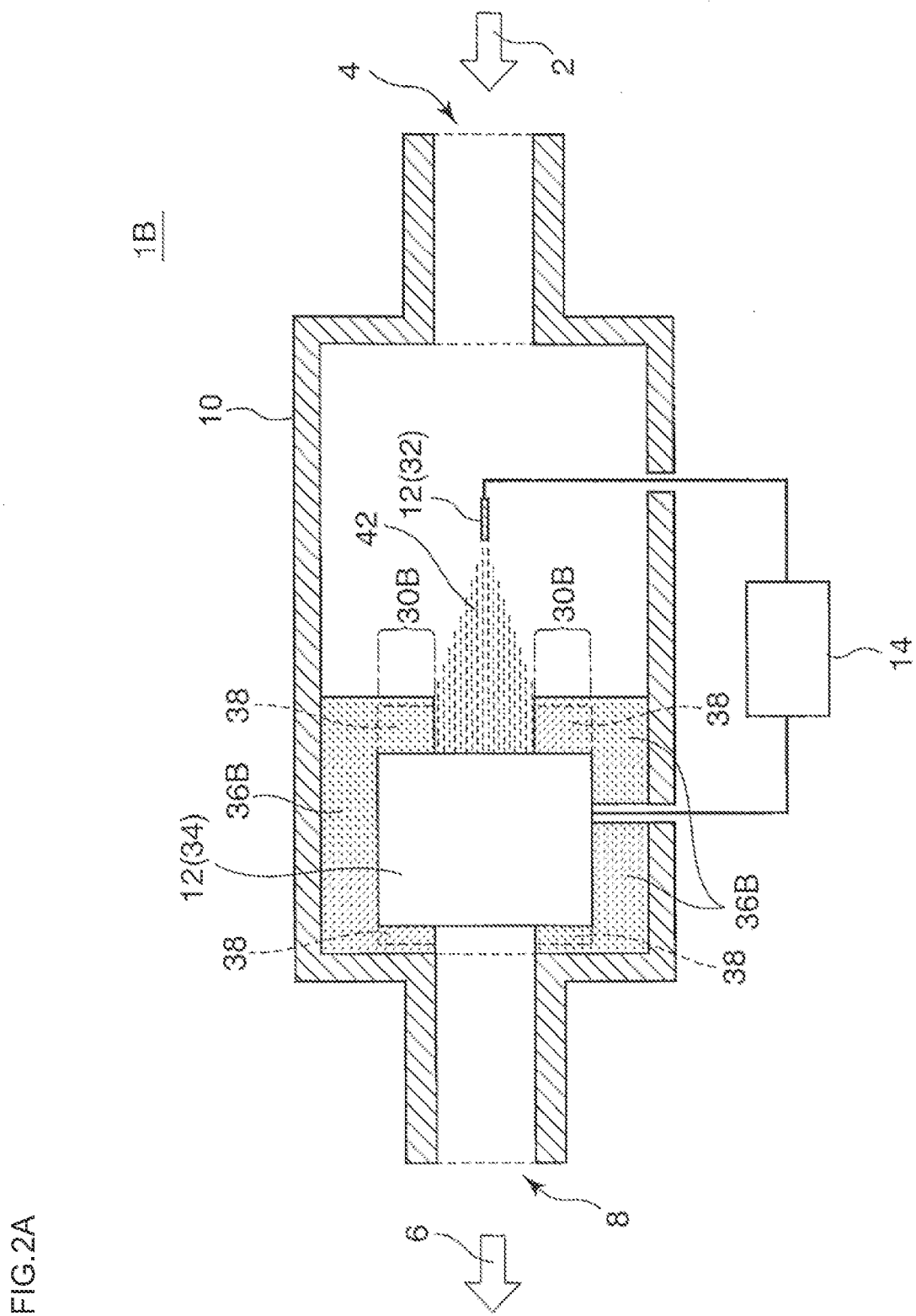
FIG. 2A is a schematic view showing another embodiment of the reactor of the present invention.

Accordingly, in the reactor of the present invention, it is preferred that, as in the reactor 1B of FIG. 2A, the protrusions (shielding members 30B) abut part of the gas-introducing end face of honeycomb electrode 34 and there are formed, in the protrusions, slits 38 for communication of the internal space of each cell overlapping with the protrusion (shielding member 30B), with the internal space of reaction vessel 10.

With such an embodiment, the to-be-reformed gas having passed through the plasma-generating zone can be preferentially introduced into the honeycomb electrode by the shielding members and the open cells of honeycomb electrode can be increased by the slits. In order to make this effect reliable, it is preferred to form slits not only at the gas-introducing end face of honeycomb electrode but also at the gas-leaving end face of honeycomb electrode.

Figure 2B:
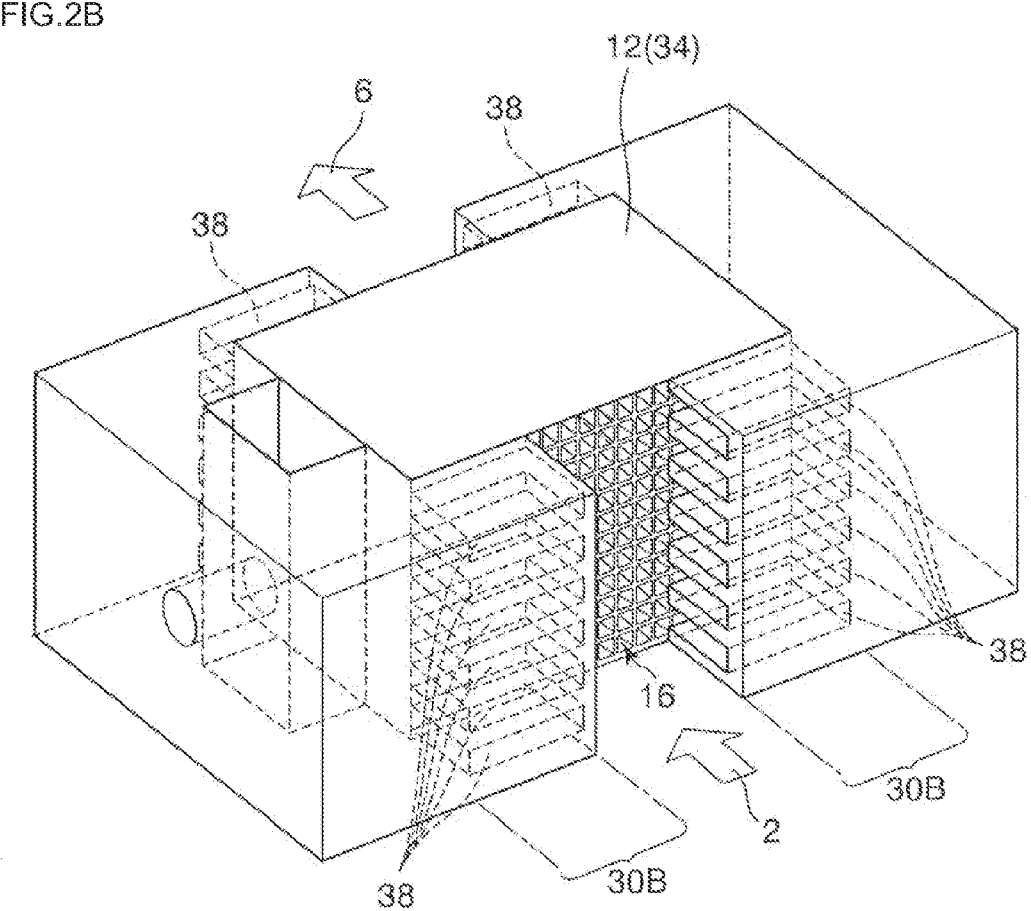
FIG. 2B is a perspective view showing a honeycomb electrode and shielding members constituting the reactor shown in FIG. 2A.

An embodiment in which slits 38 are formed in protrusions (shielding members 30B), such as shown in FIG. 2A and FIG. 2B, as compared with an embodiment shown in FIG. 3A and FIG. 3B or FIG. 4A and FIG. 4B, described later, is preferable because open cells can be increased while the end faces of honeycomb electrode 34 are held and fixed by the comb teeth formed between slits 38. The reactor of the present invention can be used also in applications such as on-vehicle vehicle mounting. Therefore, by supporting and holding the honeycomb electrode not only at the outer surface but also at the end faces, the supporting and holding state is maintained even when a vibration or an impact has been applied, which decreases the inconvenience of detachment of honeycomb electrode from its supports.

Incidentally, "overlapping with protrusions" means that the protrusions and the openings of cells overlap each other when the protrusions (shielding members) are seen from the direction of the needle-like electrode. In the case of FIG. 2A and FIG. 2B, the shielding members 30B and the cell end faces (openings) of honeycomb electrode 34 are disposed so as to abut each other and, at the abutting areas, the protrusions (shielding members 30B) and the openings of cells 16 overlap each other.

More preferably, in the reactor of the present invention, as shown in FIG. 2A and FIG. 2B, the slits 38 are formed so as to reach the opening of each outermost cell of the honeycomb electrode 34 and accordingly the internal space of each outermost cell of the honeycomb electrode 34 communicates with the internal space of the reaction vessel. By thus forming the slits, the number of open cells can be maximized and the above-mentioned effects are enhanced further.

The width and interval of slit may be determined appropriately depending upon the shape and size of honeycomb electrode, in consideration of the reliable holding and fixation of the end face of honeycomb electrode and the increased number of open cells for easy inflow of a to-be-reformed gas. From these considerations, the width of slit is preferably 1 to 20 mm, more preferably 2 to 19 mm. The interval of slit (that is, the width of each comb tooth formed between slits) is preferably 1 to 6 mm, more preferably 2 to 5 mm.

The number of slits may be determined appropriately depending upon the size of honeycomb electrode and the opening area of each cell. For example, the honeycomb electrode 34 of FIG. 2A and FIG. 2B is such a rectangular prism shape that the cell shape is a square of 1 mm×1 mm, the cell-opening end face is a rectangle of 20 mm×30 mm, and the length in cell extension direction is 20 mm. In such a honeycomb electrode, preferably 1 to 10 slits, more preferably 2 to 8 slits are formed in each of a pair of left and right shielding members.

Figure 3A:
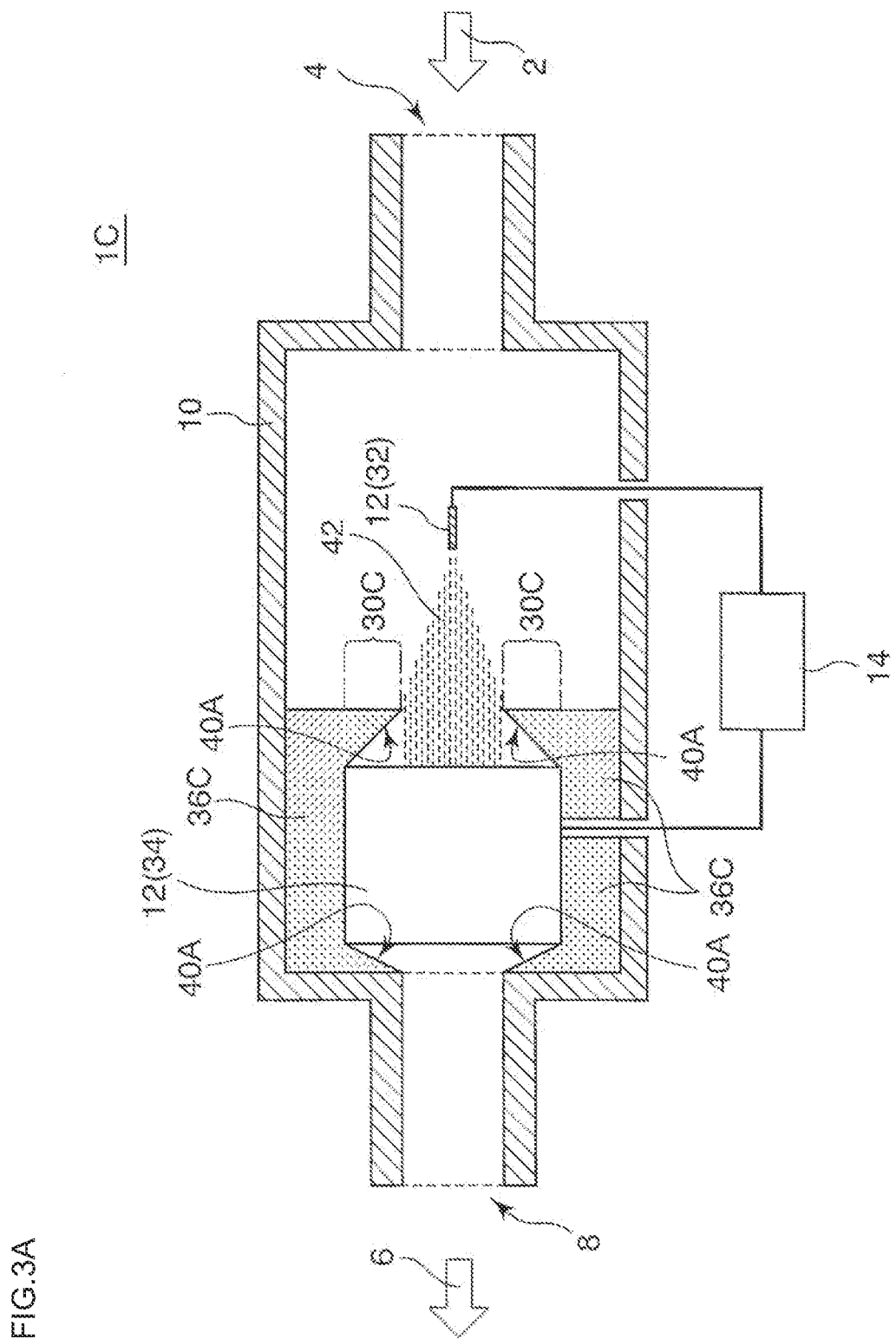
FIG. 3A is a schematic view showing still another embodiment of the reactor of the present invention.

In the reactor of the present invention, it is preferred that, as in the reactor 1C of FIG. 3A, protrusions (shielding members 30C) are formed in such a wedge shape that the protrusion amount decreases from the inlet 4 side of reaction vessel 10 toward the end face side of honeycomb electrode 34. The embodiment shown in FIG. 3A is such an embodiment in which a cut-away portion is formed in each shielding member 30C, in place of forming slits 38 in each shielding member 30B in the embodiment shown in FIG. 2A. (Hereinafter, the portion is expressed as "cut-away portion" for convenience of explanation, but the expression does not mean that the portion has been formed by cutting away).

Also, in the embodiment of forming each shielding member in a wedge shape, as in the embodiment of forming slits in each shielding member, the number of open cells can be increased. However, in the embodiment of forming each shielding member 30C in a wedge shape in FIG. 3A and FIG. 3B, as compared with the embodiment of forming slits 38 in each shielding member 30B in FIG. 2A and FIG. 2B, there is no plugging of the cell-opening end face of honeycomb electrode 34 by the comb teeth formed between slits 39, making it easy to increase the number of open cells. In order to secure this effect, it is preferred to form shielding members in a wedge shape not only at the gas-introducing end face of honeycomb electrode but also at the gas-leaving end face of honeycomb electrode.

Figure 3B:
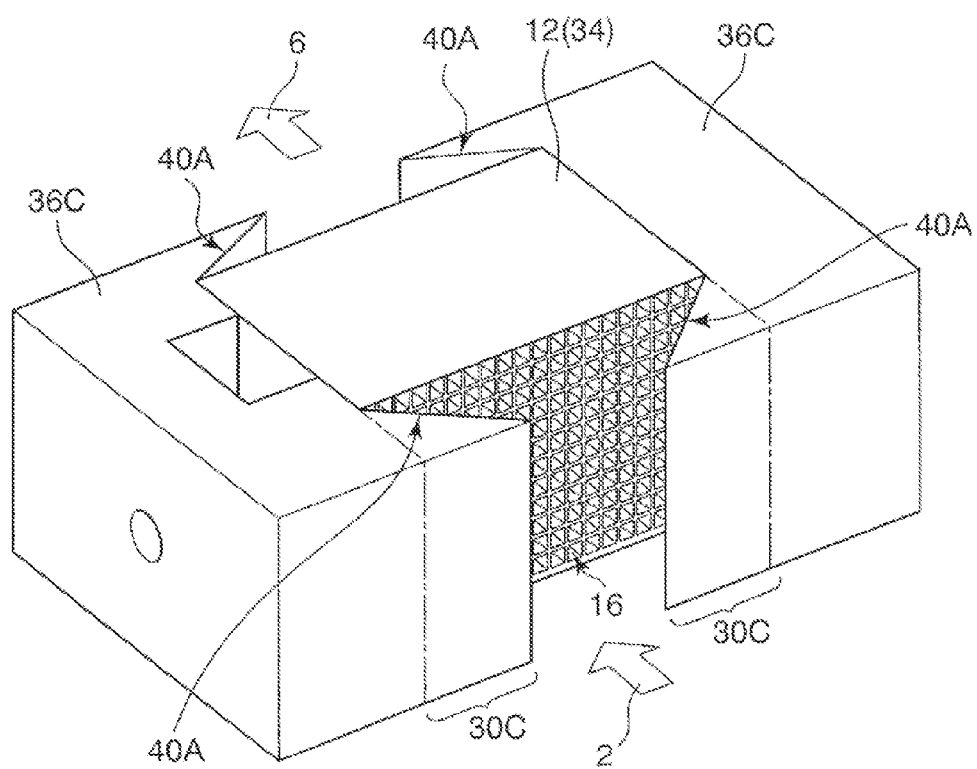
FIG. 3B is a perspective view showing a honeycomb electrode and shielding members constituting the reactor shown in FIG. 3A.

As "the wedge shape in which the protrusion amount decreases from the inlet side of reaction vessel toward the end face side of honeycomb electrode", there can be mentioned, for example, a shape such as shown in FIG. 3A and FIG. 3B, in which, when a pair of left and right shielding members 30C have been formed, each shielding member has a flat, inclined plane 40A extending from the inlet 4 side (i.e. the linear electrode 32 side) to the end face of honeycomb electrode 34. When a flat, inclined plane shown in FIG. 3A and FIG. 3B has been formed, the inclination angle is preferably 30 to 45° because the to-be-reformed gas having passed through each shielding member spreads easily over the whole area of the cell opening end face of honeycomb electrode.

Figure 4A:
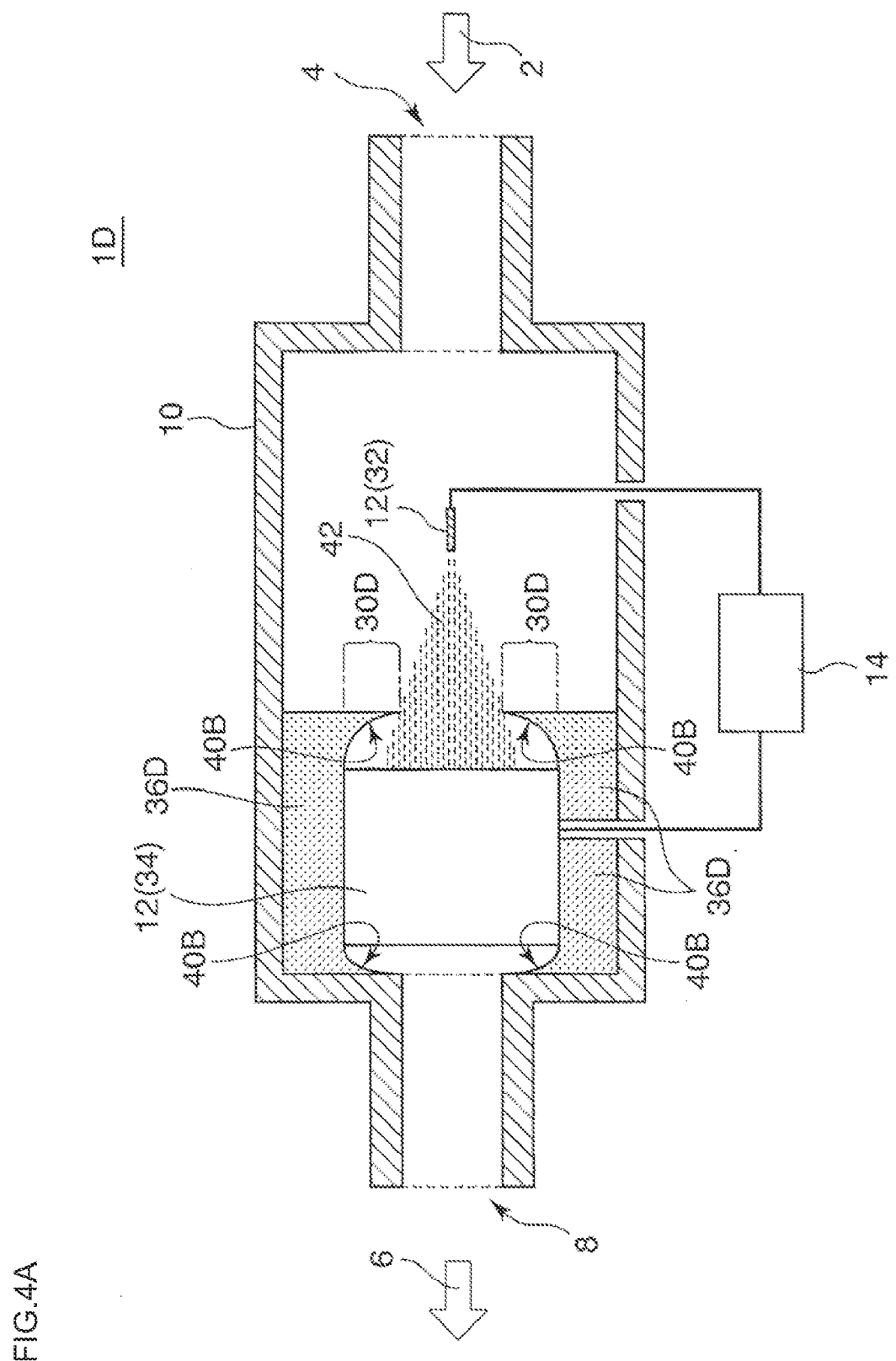
FIG. 4A is a schematic view showing still another embodiment of the reactor of the present invention.
Figure 4B:
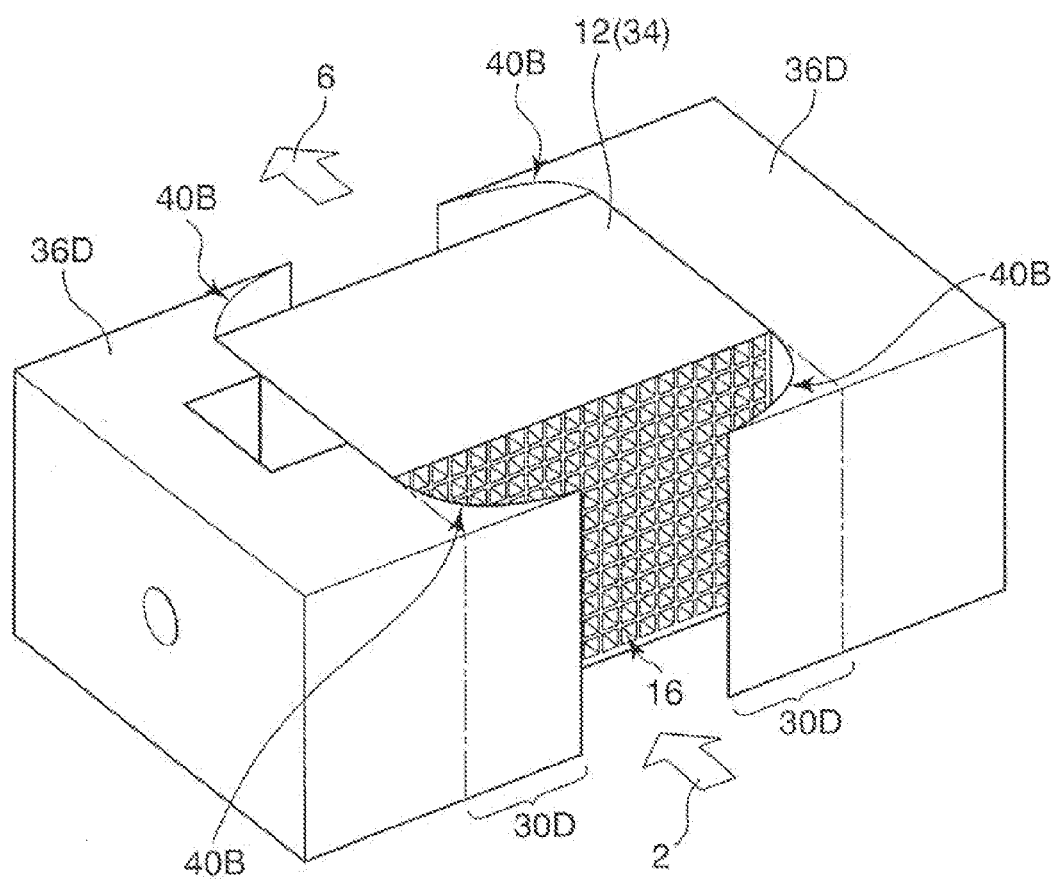
FIG. 4B is a perspective view showing a honeycomb electrode and shielding members constituting the reactor shown in FIG. 4A.

As shown in FIG. 4A and FIG. 4B, when a pair of left and right shielding members 30D are formed, the shielding members 30D may each have a curved, inclined plane 40B extending from the end face at the inlet 4 side (i.e. the linear electrode 32 side) toward the end face of the honeycomb electrode 34. When there is formed a curved, inclined plane such as shown in FIG. 4A and FIG. 4B, its radius of curvature is preferably 5 to 15 R so that the to-be-reformed gas having passed through each shielding member can easily spread over the entire area of the cell-opening end face of honeycomb electrode.

In the reactor of the present invention, as shown in FIG. 3A and FIG. 3B, the protrusions (shielding members 30C) each preferably has an inclined plane 40A extending from the end face at the inlet 4 side of the reaction vessel 10 to the opening of each outermost cell of the honeycomb electrode 34 so that the internal space of each outermost cell of the honeycomb electrode 34 and the internal space of the reactor vessel 10 communicate with each other. By thus forming protrusions (shielding members 30C), the number of open cells can be maximized and the above-mentioned effect can be enhanced further. Also in the embodiment of FIG. 4A and FIG. 4B, as in the embodiment of FIG. 3A and FIG. 3B, there are formed inclined planes 40B each extending from the end face at the inlet 4 side of the reaction vessel 10 to the opening of each outermost cell of the honeycomb electrode 34.

[2-2] Honeycomb Electrode

In the reactor of the present invention, as shown in FIG. 1A, a pair of electrodes 12 are disposed so as to face each other, in the internal space of a reaction vessel 10; and a plasma is generated by applying a voltage to the pair of electrodes 12. In the plasma-catalyst reaction apparatus of the present invention, as shown in FIG. 1A and FIG. 1B, one of the electrodes is a honeycomb electrode 34. In the present specification, "honeycomb electrode" means an electrode having a honeycomb structure, which is made of a conductive ceramics and wherein a plurality of cells to act as gas passages are formed by being surrounded by partition walls.

The structure of the honeycomb electrode is sufficient as long as it is a so-called honeycomb structure in which a plurality of cells to act as gas passages are formed by being surrounded by partition walls, and there is no particular restriction besides being a honeycomb structure. As to, for example, the cell shape (the cell sectional shape when each cell has been cut in a direction perpendicular to the cell formation direction), a desired shaped can be appropriately selected from circle, oval, triangle, tetragon, hexagon, other polygon, etc.

In the present invention, there is no particular restriction as to the cell density (i.e. the number of cells per unit sectional area) of honeycomb electrode, and the cell density may be appropriately designed so as to meet the intended application of the present reactor. However, the cell density is preferably 6 to 2,000 cells/in$^2$ (1.0 to 320 cells/cm$^2$). When the cell density is smaller than 6 cells/in$^2$, there is a fear of insufficiency in strength of partition wall (resultantly, strength of honeycomb electrode per se) and effective GSA (geometrical surface area). Meanwhile, when the cell density is larger than 2,000 cells/in$^2$, the pressure loss of the to-be-reformed gas flow may be large.

When the present reactor is used particularly for hydrogen production by hydrocarbon reforming, the cell density of the honeycomb electrode is preferably 25 to 1,163 cells/in$^2$ (4 to 186 cells/cm$^2$). When the cell density is smaller than 4 cells/cm$^2$, plasma-generating areas on the inner surfaces of each of the cells, where creeping discharge occurs, are reduced and the reforming efficiency of the to-be-reformed gas may decrease. Meanwhile, when the cell density is larger than 186 cells/cm$^2$, the back pressure resistance of the honeycomb structure may increase.

The thickness of partition wall (the wall thickness) is also appropriately designed so as to meet the intended application of the present reactor, and there is no particular restriction. When the present reactor is used, for example, for hydrogen production by hydrocarbon reforming, the wall thickness is preferably 50 μm to 2 mm, more preferably 60 to 500 μm. When the wall thickness is smaller than 50 μm, there is a reduction in mechanical strength and there may appear the breakage caused by impact and thermal stress caused by temperature change. Meanwhile, when the wall thickness is larger than 2 mm, the proportion of cell volume in honeycomb electrode is small and there is a fear that the pressure loss in passing of a to-be-reformed gas is too large.

The length of honeycomb electrode (its length in gas-flowing direction) is preferably 5 to 40 mm, more preferably 10 to 30 mm. When the length is smaller than 5 mm, the zone of plasma generation occurring on the surface of partition wall is too narrow, which may force the most of the hydrocarbon contained in a to-be-reformed gas, to leave from the reaction vessel without being reformed. Meanwhile, when the length is larger than 40 mm, a large power is needed for plasma generation and the reactor becomes large as a whole; therefore, such a reactor may not be suitable for applications such as fuel reformer for on-vehicle mounting in which small size and lightweight are required.

The "conductive ceramics" constituting the honeycomb electrode is preferably silicon carbide. However, the whole electrode need not be constituted by silicon carbide as long as the honeycomb electrode has conductivity. That is, in the reactor of the present invention, the honeycomb electrode is preferably made of a conductive ceramics containing silicon carbide. In this case, the content of silicon carbide in honeycomb electrode is preferably 50 mass % or more, more preferably 60 mass % or more in order to suppress a reduction in conductivity.

Also, the honeycomb electrode is preferably a porous body of 30 to 60% in porosity, more preferably a porous body of 40 to 50% in porosity. When the porosity is smaller than 30%, the minute discharge occurring in the gaps between ceramics particles may become insufficient. Meanwhile, when the porosity is larger than 60%, there may arise inconveniences such as insufficient strength of partition wall and the like.

The honeycomb electrode has an electric resistance of preferably 2Ω or smaller, more preferably 0.3Ω or smaller when a voltage of 3.5 V has been applied at 180° C., for securement of conductivity. In order to achieve such an electric resistance, it is preferred to use silicon carbide as the conductive ceramics and then conducting a treatment such as mixing of the silicon carbide with metallic silicon or making of a composite of the silicon carbide and metallic silicon.

Incidentally, the "electric resistance" referred herein means a value obtained by cutting out, from a honeycomb electrode, a rectangular prism of 3.3 cm in length and 1.1 cm$^2$ in sectional area (area of a section perpendicular to the flow direction of gas) along the gas-flowing direction (cell-extending direction) of honeycomb electrode and measuring, at 180° C., the electric resistance of the prism, by a constant DC, four terminal method, at a distance between voltage terminals, of 2.3 cm.

The honeycomb electrode has a thermal conductivity of preferably 5 to 30 W/mK, more preferably 10 to 200 W/mK, particularly preferably 20 to 100 W/mK, for the activation of loaded catalyst. When the thermal conductivity is lower than 5 W/mK, there is a fear that a time is taken for the activation of loaded catalyst. Meanwhile, when the thermal conductivity is higher than 300 W/mK, the heat radiation to outside is large and there is a fear that the loaded catalyst is not activated sufficiently. As the conductive ceramics having such a thermal conductivity, there can be mentioned, for example, silicon carbide, silicon nitride and aluminum nitride.

The honeycomb electrode is disposed at a distance from the linear electrode, of preferably 1 to 30 mm, more preferably 5 to 10 mm. When the distance (the electrode-to-electrode distance) is smaller than 1 mm, field concentration takes place easily and short-circuit from the point of field concentration may take place easily. Also, there is a case that plasma discharge takes place between the electrodes but the amount of hydrogen produced by the reforming reaction of hydrocarbon is small. Meanwhile, when the distance is larger than 30 mm, plasma discharge hardly takes place stably, which may reduce the efficiency of plasma generation.

[2-3] Linear Electrode

The plasma-catalyst reaction apparatus of the present invention has, as shown in FIG. 1A, a linear electrode 32 which forms a pair of electrodes 12 with the honeycomb electrode 34. The "linear electrode" referred in the present specification means a linear or planar electrode extending in one direction and includes even an electrode having a shape formed by bending of the above linear or planar electrode. There can be mentioned, for example, linear electrodes such as needle-shaped electrode, rod-shaped electrode, plate (rectangle)-shaped electrode and the like, and bent-shaped electrodes such as L-shaped electrode and the like. At least one linear electrode is disposed.

The length of the linear electrode is preferably 3 to 50 mm, more preferably 5 to 30 mm in order to make small the size of the present reactor. When the length is smaller than 3 mm, the handling of linear electrode is unstable in production of the reactor, which may make difficult the fixation of linear electrode. Meanwhile, when the length is larger than 50 mm, the linear electrode may be bent easily by the contact with the to-be-reformed gas which is flowing.

The outer diameter of the linear electrode is preferably 0.1 to 5 mm, more preferably 0.5 to 3 mm when the linear electrode is needle-shaped or rod-shaped. When the outer diameter is smaller than 0.1 mm, the linear electrode tends to be bent by the contact with the to-be-reformed gas which is flowing, which may make plasma discharge unstable. Meanwhile, when the outer diameter is larger than 5 mm, plasma discharge may be hard to control.

The linear electrode is preferably constituted by a material of high conductivity, specifically a metal, an alloy, a conductive ceramics or the like, in order to secure the conductivity. As the metal of high conductivity, there can be mentioned stainless steel, nickel, copper, aluminum, iron, etc.; as the alloy of high conductivity, there can be mentioned aluminum-copper alloy, titanium alloy, Inconel (trade name), etc.; as the conductive ceramics, there can be mentioned silicon carbide, etc.; as other material, there can be mentioned carbon, etc. Of these, a conductive material of high corrosion resistance, such as Inconel (trade name) or the like is used preferably.

[2-4] Catalyst

The reactor of the present invention has a catalyst for promoting the reforming reaction of a to-be-reformed gas, which is loaded on the partition walls of honeycomb electrode.

As to the catalyst, there is no particular restriction as long as it is a substance having the above-mentioned catalytic activity. There can be mentioned, for example, a substance containing at least one kind of element selected from the group consisting of noble metal (e.g. platinum, rhodium, palladium, ruthenium, indium, silver or gold), aluminum, nickel, zirconium, titanium, cerium, cobalt, manganese, zinc, copper, tin, iron, niobium, magnesium, lanthanum, samarium, bismuth and barium. The substance containing such an element includes various forms such as simple metal, metal oxide, other compound (e.g. chloride or sulfate) and the like. These substances may be used singly or in combination of two or more kinds.

The loading amount of the catalyst is preferably 0.05 to 70 g/liter, more preferably 0.1 to 40 g/liter. When the loading amount is smaller than 0.05 g/liter, the exhibition of catalytic activity may be difficult. Meanwhile, when the loading amount is larger than 70 g/liter, the production cost of the reactor may increase.

The catalyst is loaded on the partition walls of the honeycomb electrode preferably in the form of catalyst-coated fine particles obtained by coating a catalyst on carrier fine particles. Such a form has an advantage that the efficiency of the reaction of a to-be-reformed gas by catalyst is enhanced. As the carrier fine particles, a ceramics powder, for example, can be used. There is no particular restriction as to the kind of the ceramics; however, there can preferably be used powders of metal oxides, particularly silica, alumina, titania, zirconia, ceria, zeolite, mordenite, silica alumina, metal silicate, cordierite, etc. These ceramics can be used singly or in combination of two or more kinds. Catalyst loading can be conducted by coating such catalyst-coated fine particles on the partition walls of honeycomb electrode.

The average particle diameter of the above-mentioned powders is preferably 0.01 to 50 μm, more preferably 0.1 to 20 μm. When the average particle diameter is smaller than 0.01 μm, the loading of catalyst on carrier fine particles may be difficult. Meanwhile, when the average particle diameter is larger than 50 μm, the catalyst-coated fine particles may easily be peeled off from the honeycomb electrode.

The mass ratio of the catalyst to the carrier fine particles is preferably 0.1 to 20 mass %, more preferably 1 to 10 mass %. When the mass ratio of catalyst is smaller than 0.1 mass %, the reforming reaction may proceed hardly. Meanwhile, when the mass ratio is larger than 20 mass %, there is no uniform dispersion of catalyst and the catalyst is easily agglomerated; therefore, the uniform loading of catalyst on carrier fine particles is difficult. Accordingly, even with the addition of catalyst in an amount exceeding 20 mass %, there is no effect of catalyst addition corresponding to the amount and there may be no promotion of reforming reaction.

The catalyst-coated fine particles can be obtained, for example, by infiltrating a catalyst component-containing aqueous solution into a ceramics powder later becoming carrier fine particles, followed by drying and firing. To the catalyst-coated fine particles obtained are added a dispersing medium (e.g. water) and other additives, to prepare a coating fluid (a slurry); this slurry is coated on the partition walls of honeycomb electrode; thereby, the catalyst can be loaded on the partition walls of honeycomb electrode.

[2-5] Reaction Vessel

The reactor of the present invention has, as shown in FIG. 1A, a reaction vessel 10 provided with an inlet 4 of a to-be-reformed gas 2 and an outlet 8 of a reformed gas 6. The reaction vessel is a hollow structure provided with the inlet of the to-be-reformed gas and the outlet of the reformed gas. The reaction vessel is required to be hollow for gas passage therethrough; however, there is no other restriction as to the shape of the reaction vessel and there can be used, for example, a cylindrical, prism-like, or other structure. As to the maximum inner diameter of the reaction vessel, there is no particular restriction, either, and an appropriate size can be employed depending upon the intended application of the reactor.

As to the material for reaction vessel, there is no particular restriction, either. However, the reaction vessel is constituted preferably by a metal of good processability (e.g. stainless steel). However, for example, the portion of reaction vessel where the electrode is installed, such as honeycomb electrode support, is constituted preferably by an insulating material in order to prevent short-circuit.

[2-6] Power Source

The power source is, as shown in FIG. 1A, a power source 14 for applying a voltage to a pair of electrodes 12 (a linear electrode 32 and a honeycomb electrode 34). As to the kind of the power source, there is no particular restriction; however, it is preferred to use a pulse power source capable of applying a voltage periodically. The pulse power source is particularly preferably a power source capable of supplying (a) an AC voltage waveform of 1 kV or higher in peak voltage and 1 or more in pulse number per second, (b) an AC voltage waveform of 1 kV or higher in peak voltage and 1 or more in frequency, (c) a DC waveform of 1 kV or higher in voltage, or (d) a voltage waveform obtained by overlapping at least two of the above waveforms. Use of a power source of 1 to 20 kV in peak voltage is preferred and use of a power source of 5 to 10 kV in peak voltage is more preferred.

As such a power source, there can be mentioned, for example, a high-voltage pulse power source which uses, as a switching element, a static induction type thyristor (SI thyristor) or a MOS-FET. In particular, a high-voltage pulse power source (for example, a product of NGK) using a SI thyristor as a switching element is preferably used because it can be used in wide applications. Incidentally, the "MOS-FET" means a field effect transistor (FET) having a gate electrode of three-layer structure of metal-semiconductor oxide-semiconductor.

[3] Production Method

The reactor of the present invention can be produced, for example, by the following method. A honeycomb structure to act as a honeycomb electrode is obtained by a known extrusion method. Specifically explaining, a puddle containing a ceramics powder is extruded into a desired shape, followed by drying and firing, to obtain a honeycomb structure to act as a honeycomb electrode. In this case, a conductive silicon carbide or the like is used as the raw material ceramics for obtaining the honeycomb structure. As to the reaction vessel, a tubular (cylindrical) reaction vessel is formed by a known metal processing method. In this case, an easily processable metal material such as stainless steel or the like is preferably used as the metal material for obtaining the reaction vessel.

On the partition walls of the above-obtained honeycomb electrode is loaded a catalyst. Beforehand, a catalyst component-containing aqueous solution is infiltrated into a ceramics powder to act as carrier fine particles, followed by drying and firing, to obtain a catalyst-coated fine particles. To the catalyst-coated fine particles are added a dispersing medium (e.g. water) and other additives to prepare a coating fluid (a slurry). This slurry is coated on the partition walls of the honeycomb electrode, followed by drying and firing, to obtain a honeycomb electrode having a catalyst loaded on the partition walls.

The above-obtained honeycomb electrode is installed in the internal space of the reaction vessel via honeycomb electrode supports made of an insulating material such as alumina or the like. The honeycomb electrode is disposed apart from a linear electrode by a given distance and so as to oppose the linear electrode. In this case, shielding members are disposed between the honeycomb electrode and the linear electrode. The shielding members can be constituted by protruding part of each honeycomb electrode support toward the gas-introducing end face side of the honeycomb electrode. Lastly, the honeycomb electrode and the linear electrode are electrically connected with a power source, whereby a reactor can be constituted.

[4] [Method of Use]

The reactor of the present invention can be suitably used for a reforming reaction, particularly a reforming reaction for obtaining a hydrogen-containing reformed gas from a to-be-reformed gas (a hydrocarbon compound or an alcohol).

As the "hydrocarbon compound", there can be mentioned, for example, light hydrocarbons such as methane, propane, butane, heptane, hexane and the like; and petroleum hydrocarbons such as isooctane, gasoline, kerosene, naphtha and the like. As the "alcohol", there can be mentioned, for example, methanol, ethanol, 1-propanol, 2-propanol and 1-butanol. These to-be-reformed gases can be used singly or in admixture of two or more kinds.

As to the method of reforming, there is no particular restriction. There can be used, for example, any of partial reforming using oxygen, steam reforming using water, and autothermal reforming using oxygen and water.

The reforming reaction can be conducted by using the reactor of the present invention, introducing a to-be-reformed gas into the internal space of the reaction vessel, and applying, from the power source to the electrodes, a pulse voltage having one voltage waveform selected from (a) a voltage waveform of 1 kV or higher in peak voltage and 1 or more in pulse number per second, (b) an AC voltage waveform of 1 kV or higher in peak voltage and 1 or more in frequency, (c) a DC waveform of 1 kV or higher in voltage, and (d) a voltage waveform obtained by overlapping at least two of the above waveforms.

EXAMPLES

The reactor of the present invention is described more specifically by showing Examples. However, the present reactor includes all reactors satisfying the matters specified by the present invention and is in no way restricted to the following Examples.

[Production of Reactors]

At first, reactors were produced as follows.

Example 1

A reactor 1B such as shown in FIG. 2A was produced. As the reaction vessel 10, there was used a hollow, quadrangular prism-shaped material of 40 mm (height)×50 mm (width)×70 mm (length), made of a stainless steel plate of 5 mm in thickness. Inside the reactor vessel 10 were fixed honeycomb electrode supports made of alumina. To the honeycomb electrode supports was fixed a honeycomb electrode 34 made of silicon carbide. Similarly, a linear electrode 32 was disposed on an alumina insulator.

As the honeycomb electrode 34, there was used a honeycomb structure in which a plurality of cells 16 to act as gas passages were formed by being surrounded by partition walls, as shown in FIG. 2B. As the honeycomb structure, there was used a rectangular prism of 20 mm (height)×30 mm (width)×20 mm (length) cut out from a silicon carbide-made diesel particulate filter [SiC-DPF (trade name), a product of NGK] used for capturing a particulate matter contained in engine exhaust gas or the like. This honeycomb structure had a square cell shape of 1 mm×1 mm and a cell density of 46 cells/cm$^2$.

Also from the SiC-DPF was cut out a rectangular prism of 3.3 cm (length) and 1.1 cm$^2$ (area of the section perpendicular to the direction of gas flowing), along the direction of gas flowing. Electric resistance of the rectangular prism was measured under a temperature condition of 180° C. by a constant DC four-terminal method with a distance between voltage terminals being 2.3 cm. The electric resistance was 0.2Ω. The thermal conductivity of the rectangular prism was 100 W/mK.

The honeycomb structure was loaded with a catalyst at the partition walls surrounding cells. Beforehand, an aqueous rhodium (III) nitrate [Rh(NO$_3$)$_3$] solution containing a catalyst component Rhodium was infiltrated into an alumina powder (specific surface area: 107 m$^2$/g) to later act as carrier fine particles, followed by drying at 120° C. and firing at 550° C. for 3 hours in the air, to obtain a catalyst-coated fine particles. The mass ratio of rhodium to alumina was 0.5 mass %.

To the catalyst-coated fine particles were added a dispersing medium (water) and an alumina sol; the mixture was adjusted to a pH of 4 to obtain a coating fluid (a slurry). The honeycomb electrode was immersed in this slurry to coat the slurry on the partition walls, followed by drying at 120° C. and firing at 550° C. for 1 hour in a nitrogen atmosphere, to obtain a honeycomb electrode having a catalyst loaded on the partition walls. The amount of Rhodium loaded on the honeycomb electrode was 1.5 g/liter.

As the linear electrode 32, there was used a rod-like material of 10 mm in length and 0.5 mm in outer diameter, made of stainless steel. The honeycomb electrode 34 was disposed so that its distance from the linear electrode 32 became 5 mm. Incidentally, in the reactor 1B, the linear electrode 32 was used as a positive electrode.

As the power source 14, there was used a high-voltage pulse power source (a product of NGK) using a SI thyristor as the switching element. The power source 14 was electrically connected to the linear electrode (positive electrode) and the honeycomb electrode 34 (negative electrode).

Incidentally, as shown in FIG. 2A and FIG. 2B, shielding members 30B were constituted by protruding part of each honeycomb electrode support 36B toward the end face side of the honeycomb electrode 34. Since the width of the plasma-generating zone 42 generated by applying a voltage of 5 kV to the honeycomb electrode 34 and linear electrode 32 disposed as above was 10 to 12 mm, part of each honeycomb electrode support 36B was protruded toward the end face side of the honeycomb electrode 34 by 10 mm to form a pair of left and right shielding members 30B. Thereby, an opening of 10 mm in width is formed between the pair of left and right shielding members 30B.

The distance between the end face of each shielding member 30B at the linear electrode 32 side and the linear electrode 32 was 3 mm, and the distance between the end face of each shielding member 30B at the honeycomb electrode 34 side and the honeycomb electrode 34 was 0 mm.

The shielding members 30B were constituted so as to abut part of the gas-introducing end face of the honeycomb electrode 34 and there were formed, in the shielding members 30B, slits 38 for allowing the internal space of each cell overlapping with the shielding member 30B, to communicate with the internal space of the reaction vessel 10. The slits 38 were formed so as to reach the opening of each outermost cell so that the internal space of each outermost cell of the honeycomb electrode 34 and the internal space of the reaction vessel 10 communicate with each other.

Specifically explaining, the width of each slit 38 was 2 mm, the interval between each adjacent two slits 38 was 1 mm, and the number of slits 38 in each shielding member 30B was 6.

Example 2

A reactor 1C such as shown in FIG. 3A was produced in the same manner as in Example 1 except that the shape of each honeycomb electrode support was changed. At first, as in Example 1, part of each honeycomb electrode support 36C was protruded toward the end face side of the honeycomb electrode 34 by 10 mm to form a pair of left and right shielding members 30C. Thereby, an opening of 10 mm in width was formed between the pair of left and right shielding members 30C.

However, the protrusions of the honeycomb electrode supports 36C (the shielding members 30C) were formed in such a wedge shape that the protrusion amount of each protrusion decreased from the inlet 4 side of the reaction vessel 10 toward the end face side of the honeycomb electrode 34. Specifically explaining, as shown in FIG. 3A and FIG. 3B, there was formed a flat, inclined plane 40A extending from the end face of each shielding member 30C facing the inlet 4 (i.e. the linear electrode 32) toward the end face of the honeycomb electrode 34. The inclination angle thereof was 30°.

Example 3

A plasma-catalyst reaction apparatus 1D such as shown in FIG. 4A was produced in the same manner as in Example 1 except that the shape of each honeycomb electrode support was changed. At first, as in Example 1, part of each honeycomb electrode support 36D was protruded toward the end face side of the honeycomb electrode 34 by 10 mm to form a pair of left and right shielding members 30D. Thereby, an opening of 10 mm in width was formed between the pair of left and right shielding members 30D.

However, the protrusions of the honeycomb electrode supports 36D (the shielding members 30D) were formed in such a wedge shape that the protrusion amount of each protrusion decreased from the inlet 4 side of the reaction vessel 10 toward the end face side of the honeycomb electrode 34. Specifically explaining, as shown in FIG. 4A and FIG. 4B, there was formed a curved, inclined plane 40B extending from the end face of each shielding member 30D facing the inlet 4 (i.e. the linear electrode 32) toward the end face of the honeycomb electrode 34. Its radius of curvature was 10R.

Comparative Example 1

A reactor 100 such as shown in FIG. 5 was produced in the same manner as in Example 1 except that the shape of each honeycomb electrode support was changed. Specifically explaining, as shown in FIG. 5, each honeycomb electrode support 36 was formed so that it held and fixed only the side walls of the honeycomb electrode 34, and there was formed no protrusion (shielding member) protruding toward the end face side of the honeycomb electrode 34.

[Test for Hydrocarbon Reforming]

A test for hydrocarbon reforming was conducted using the reactors of Examples and Comparative Example. Specifically explaining, a partial oxidation reaction for pentadecane ($C_{15}H_{32}$), shown by the following formula (1) was conducted. The to-be-reformed gas used was a nitrogen gas containing 2,000 ppm of pentadecane ($C_{15}H_{32}$) and 16,000 ppm of oxygen. The to-be-reformed gas was prepared by injecting a given amount of pentadecane using a high-pressure microfeeder [JP-H Model (trade name), a product of Furue Science]. The pentadecane was vaporized using a plate heater placed in a pipe and then introduced.

$$C_{15}H_{32} + 7.5O_2 \rightarrow 16H_2 + 15CO \quad (1)$$

The to-be-reformed gas was fed into a reactor and a reforming reaction (partial oxidation) was conducted. A pulse voltage was applied to the pair of electrodes from the power source under the conditions of a repeating interval of 3 kHz and a peak voltage of 5 kV. The space velocity (SV) of the to-be-reformed gas inside the reaction vessel was adjusted to be 80,000 h$^{-1}$ in each cell of the honeycomb electrode.

A hydrogen amount was measured for the reformed gas obtained from the reforming reaction. The measurement of the hydrogen amount was conducted using TCD (thermal conduction detector)-containing gas chromatography (GC 3200 produced by G. L. Science, carrier gas: argon). From this hydrogen amount and the above-shown formula (1) was calculated the pentadecane amount consumed by the reforming reaction, and the hydrogen formation ratio was calculated from the following formula (2). A hydrogen formation ratio of 30 mass % or more was rated as "extremely good"; a hydrogen formation ratio of 25 mass % to less than 30 mass % was rated as "good"; and a hydrogen formation ratio of less than 25 mass was rated as "bad". The results are shown in Table 1.

Hydrogen formation ratio (mass %)=(pentadecane amount calculated from hydrogen amount in a to-be-reformed gas/ pentadecane amount in a reformed gas)×100 (2)

TABLE 1

|  | Example 1 | Example 2 | Example 3 | Comparative Example 1 |
|---|---|---|---|---|
| Hydrogen formation ratio (mass %) | 33 Extremely good | 35 Extremely good | 35 Extremely good | 22 Bad |

The reactors of Examples 1 to 3 showed a high hydrogen formation ratio as compared with the reactor of Comparative Example 1. From these results, it is considered that, in the plasma-catalyst reaction apparatuses having shielding members, the ratio at which the to-be-reformed gas having passed through the plasma-generating zone and activated (or partially given rise to a reaction) passes through the cells of honeycomb electrode, is high, the synergistic effect between plasma and catalyst is high, and a reformed gas is obtained at a higher efficiency. That is, although the power applied for plasma generation was the same as in Comparative Example 1, a reformed gas (hydrogen) could be obtained efficiently.

Also, of the reactors of Examples 1 to 3, the reactors of examples 2 and 3 wherein the honeycomb electrode supports were formed in a wedge shape, as compared with the plasma-catalyst reaction apparatus of Example 1 wherein slits were formed in each protrusion of the honeycomb electrode support, showed a slightly better result. This is considered to be because the reactor of Example 1, although being the same as the reactors of Examples 2 and 3 in that the to-be-reformed gas having passed through the plasma-generating zone is preferentially introduced into the honeycomb electrode, gives rise to pressure loss at the slits, suppressing the flow of the to-be-reformed gas. From this, it is considered that the embodiment of forming shielding members in a wedge shape, as compared with the embodiment of forming slits in the shielding members, can give a higher reaction efficiency of reforming reaction.

In the above Examples, cases of partial oxidation were shown. However, also in other reforming methods such as autothermal oxidation using oxygen and water, high hydrogen formation ratios were obtained as compared with the case of using a conventional reactor. Thus, the reactor of the present invention can be used in various reforming methods.

Industrial Applicability

The reactor of the present invention can be used suitably in the reforming reaction of hydrocarbon compound or alcohol, particularly in a hydrogen formation reaction. The present reactor can supply a large amount of a reformed gas stably over a long period; accordingly, it can be suitably used also in applications such as fuel reformer for on-vehicle mounting.

What is claimed is:

1. A reactor comprising
a reaction vessel having an inlet for a to-be-reformed gas and an outlet for a reformed gas,
a pair of electrodes for plasma generation, disposed in an internal space of the reaction vessel so as to face each other,
a power source for applying a voltage to the pair of electrodes, and
a catalyst for promoting reforming reaction of the to-be-reformed gas,
wherein
one of the pair of electrodes is a linear electrode,
the other of the pair of electrodes is a honeycomb electrode made of a conductive ceramics having a plurality of cells to act as gas passages partitioned by partition walls, and
the catalyst is loaded on the partition walls of the honeycomb electrode,
the reactor further comprising
shielding members protruded from a gas-introducing end face of the honeycomb electrode in a space between the linear electrode and the honeycomb electrode to prevent the to-be-reformed gas passing through a zone other than a plasma-generating zone from flowing into the honeycomb electrode.

2. A reactor according to claim 1 further comprising
a pair of honeycomb electrode supports for supporting and holding the honeycomb electrode, being made of an insulating material and disposed so as to sandwich the honeycomb electrode and face each other,
wherein each of the shielding members is constituted by a protrusion formed by a part of each of the honeycomb electrode supports protruded from the gas-introducing end face of the honeycomb electrode.

3. A reactor according to claim 2, wherein each protrusion is constituted so as to abut on a part of the gas-introducing end face of the honeycomb electrode and has slits formed therein so that the internal space of the reaction vessel communicates with an internal space of each of the plurality of cells overlapping with the protrusion.

4. A reactor according to claim 3, wherein the slits are formed to reach openings of outermost cells of the honeycomb electrode so that the internal space of the reaction vessel communicates with an internal space of each of the outermost cells of the honeycomb electrode.

5. A reactor according to claim 2, wherein the protrusion is formed in such a wedge shape that a protrusion volume becomes less from the inlet of the reaction vessel toward an end face side of the honeycomb electrode.

6. A reactor according to claim 5, wherein the protrusion has an inclined plane extending from an end face of the protrusion facing the inlet of the reaction vessel, to outside of openings of outermost cells of the honeycomb electrode, so that an internal space of each of the outermost cells of the honeycomb electrode communicates with the internal space of the reaction vessel.

7. A reactor according to claim 1, wherein the honeycomb electrode is made of the conductive ceramics including silicon carbide.

8. A reactor according to claim 1, wherein the honeycomb electrode has a thermal conductivity of 10 to 300 W/mk.

9. A reactor according to claim 1, wherein the power source is a high-voltage pulse power source using a static induction thyristor.

* * * * *